(12) United States Patent
Asai et al.

(10) Patent No.: US 6,372,809 B1
(45) Date of Patent: Apr. 16, 2002

(54) FOAMABLE RUBBER COMPOSITION AND FOAMED RUBBER

(75) Inventors: Manabu Asai; Yoshiaki Aimura, both of Kawasaki (JP)

(73) Assignee: Zeon Corporation, Tokyo (JP)

(*) Notice: Subject to any disclaimer, the term of this patent is extended or adjusted under 35 U.S.C. 154(b) by 0 days.

(21) Appl. No.: 09/926,073

(22) PCT Filed: Feb. 25, 2000

(86) PCT No.: PCT/JP00/01092

§ 371 Date: Aug. 24, 2001

§ 102(e) Date: Aug. 24, 2001

(87) PCT Pub. No.: WO00/50499

PCT Pub. Date: Aug. 31, 2000

(30) Foreign Application Priority Data

Feb. 26, 1999 (JP) .............................................. 11-050103

(51) Int. Cl.⁷ .................................................. C08J 9/00

(52) U.S. Cl. ............................ 521/93; 521/96; 521/139; 521/153

(58) Field of Search .......................... 521/93, 139, 153, 521/96

(56) References Cited

FOREIGN PATENT DOCUMENTS

JP 6-107740 A * 4/1994

* cited by examiner

*Primary Examiner*—Morton Foelak
(74) *Attorney, Agent, or Firm*—Armstrong, Westerman & Hattori, LLP

(57) ABSTRACT

A foamable rubber composition comprising 100 parts by weight of a nitrile group-containing highly saturated copolymer rubber, 5 to 100 parts by weight of polyethylene, 3 to 100 parts by weight of a metal salt of an ethylenically unsaturated carboxylic acid, 0.5 to 10 parts by weight of an organic peroxide and 1 to 15 parts by weight of a foaming agent is foamed and shaped into a foamed rubber product.

17 Claims, No Drawings

# FOAMABLE RUBBER COMPOSITION AND FOAMED RUBBER

TECHNICAL FIELD

This invention relates to a foamable rubber composition and a foamed rubber. More particularly, it relates to a foamable rubber composition having enhanced processability and giving a foamed and shaped rubber article having enhanced hardness, and good shrink-resistance tear-resistance and abrasion-resistance; and the foamed and shaped rubber article.

BACKGROUND ART

A foamed rubber article has a reduced specific gravity and thus is light-weight, and exhibits good impact absorption and heat-insulation, and therefore, is used in many fields. As rubber materials for foamed rubber articles, there can be mentioned natural rubber, and synthetic rubbers such as a polyisoprene rubber, an acrylonitrile-butadiene copolymer rubber, a styrene-butadiene copolymer rubber, an ethylene-propylene copolymer rubber and an ethylene-vinyl acetate copolymer rubber.

Recently, there was proposed a foamed rubber article made from a foamable rubber composition comprising a hydrogenated acrylonitrile-butadiene copolymer rubber having incorporated therein a zinc salt of an ethylenically unsaturated carboxylic acid, a metal salt of a higher fatty acid, a foaming agent and an organic peroxide (for example, Japanese Unexamined Patent Publication No. H6-107740). This foamable rubber composition was proved to give a foamed and shaped rubber product exhibiting a large shrinkage after crosslinked or after heat-treated in the course of making the foamed and shaped rubber article, namely, the rubber composition is difficult to shape into a foamed and shaped rubber article.

DISCLOSURE OF THE INVENTION

An object of the present invention is to provide a foamable rubber composition giving a foamed and shaped rubber article exhibiting no shrinkage after crosslinked or after heat-treated in the course of making the foamed and shaped rubber article, the conditions for making the foamed and shaped rubber article from which composition are easy to control at the step of making the foamed and shaped rubber article, and which composition exhibits good foamability.

Another object of the present invention is to provide a foamed and shaped rubber article exhibiting improved tear-resistance, abrasion-resistance and other properties, and having large elongation and high hardness.

The present inventors made extensive researches to achieve the above-mentioned objects and found that a foamable rubber composition comprising a nitrile group-containing highly saturated copolymer rubber and polyethylene exhibited enhanced processability and foamability, and gave a foamed and shaped article exhibiting good shrink- resistance, tear-resistance and abrasion resistance and having large elongation and high hardness. Based on this finding, the present invention has been completed.

In accordance with the present invention, there is provided a foamable rubber composition comprising a nitrile group-containing highly saturated copolymer rubber, polyethylene, a metal salt of an ethylenically unsaturated carboxylic acid, an organic peroxide and a foaming agent.

In accordance with the present invention, there is further provided a foamed and shaped rubber article made by foaming and shaping the above-mentioned foamable rubber composition,

BEST MODE FOR CARRYING OUT THE INVENTION

Nitrile Group-Containing Highly Saturated Copolymer Rubber

The nitrile group-containing highly saturated copolymer rubber is a rubber having an iodine value not larger than 120 obtained by copolymerization of an $\alpha, \beta$-ethylenically unsaturated nitrile monomer with other monomer or monomers. Iodine value is an indication demonstrating the degree of unsaturation of carbon-carbon bond, and expressed in terms of amount in gram of iodine capable of being added to 100 g of a rubber.

The monomer to be copolymerized with an $\alpha, \beta$-ethylenically unsaturated nitrile monomer includes, for example, conjugated diene monomers, non-conjugated diene monomers and $\alpha$-olefin monomers. In the case where an $\alpha, \beta$-ethylenically unsaturated nitrile monomer is copolymerized with a conjugated dione monomer, a copolymer rubber having too large iodine value tends to be produced. When a copolymer rubber having too large iodine value is produced, the copolymer rubber may be subjected to hydrogenation addition whereby the carbon-carbon unsaturated bonds in the copolymer rubber are hydrogenated and the iodine value of copolymer rubber is lowered.

The $\alpha, \beta$-ethylenically unsaturated nitrile monomer includes, for example, acrylonitrile, methaorylonitrile and $\alpha$-chloroacrylonitrile. Of these, acrylonitrile is, preferable. These monomers may be used either alone or in combination.

The lower limit of the content of $\alpha, \beta$-ethylenically unsaturated nitrile monomer units in the nitrile group-containing highly saturated copolymer rubber is preferably 10% by weight, and the upper limit thereof is preferably 60% by weight, more preferably 55% by weight and especially preferably 50% by weight.

As specific examples of the conjugated diene monomer, there can be mentioned 1,3-butadiene, isoprene, 2,3-dimethyl-1,3-butadiene and 1,3-pentadiene. Of these, 1,3-butadiene is preferable. In the case where the nitrile group-containing highly saturated copolymer rubber is a copolymer of an $\alpha, \beta$-ethylenically unsaturated nitrile monomer, a conjugated diene monomer and an optional copolymerizable monomer or monomers, or its hydrogenation product, the lower limit of the content of conjugated dione monomer units in the copolymer rubber is preferably 30% by weight, more preferably 40% by weight and especially preferably 30% by weight, and the upper limit thereof is preferably 90% by weight.

The non-conjugated dione monomer preferably includes those which have 5 to 12 carbon atoms, such as, for example, 1,4-pentadiene and 1,4-hexadiene.

The $\alpha$-olefin monomer preferably includes those which have 2 to 12 carbon atoms, such as, for example, ethylene, propylene, 1-butene, 4-methyl-1-pentene, 1-hexene and 1-octene.

The optional monomer copolymerizable with an $\alpha, \beta$-ethylenically unsaturated nitrile monomer includes, for example, unsaturated carboxylic acid esters, aromatic vinyl monomers, fluorine-containing vinyl monomers, unsaturated monocarboxylic acids, unsaturated dicarboxylic acids and anhydrides thereof, and copolymerizable antioxidants.

As specific examples of the unsaturated carboxylic acid esters, there can be mentioned alkyl acrylates and alkyl methacrylates, which have 1 to 18 carbon atoms in the alkyl group, such as methyl acrylate, ethyl acrylate, n-dodecyl acrylate, methyl methacrylate and ethyl methacrylate; alkoxyalkyl acrylates and alkoxyalkyl methacrylates, which have 2 to 12 carbon atoms in the alkoxyalkyl group, such as methoxymethyl acrylate and methoxyethyl methacrylate; cyanoalkyl acrylates and cyanoalkyl methacrylates, which have 2 to 12 carbon atoms in the cyanoalkyl group, such as α-cyanoethyl acrylate, β-cyanoethyl acrylate and cyanobutyl methacrylate; hydroxyalkyl acrylates such as 2-hydroxyethyl acrylate and hydroxypropyl acrylate; monoalkyl or dialkyl esters of unsaturated dicarboxylic acids such as monoethyl maleate, dimethyl maleate, dimethyl fumarate, dimethyl itaconate, n-butyl itaconate and diethyl itaconate; amino group-containing unsaturated carboxylic acid esters such as dimethylaminomethyl acrylate and diethylaminoethyl acrylate; fluoroalkyl group-containing acrylates and fluoroalkyl group-containing methacrylates, such as trifluoroethyl acrylate and tetrafluoropropyl methacrylate; and fluoro-substituted benzyl acrylates and fluoro-substituted benzyl methacrylates, such as fluorobenzyl acrylate and fluorobenzyl methacrylate.

As specific examples of the aromatic vinyl monomer, there can be mentioned styrene, α-methylstyrene and vinylpyridine.

As specific examples of the fluorine-containing vinyl monomer, there can be mentioned fluoroethyl vinyl ether, fluoropropyl vinyl ether, o-trifluoromethylstyrene, vinyl pentafluorobenzoate, difluoroethylene and tetrafluoroethylene. As specific examples of the unsaturated monocarboxylic acid, there can be mentioned acrylic acid and methacrylic acid. As specific examples of the unsaturated dicarboxylic acid and its anhydride, there can be mentioned itaconic acid, fumaric acid and maleic acid, and maleic anhydride, respectively. As specific examples of the copolymerizable antioxidant, there can be mentioned N-(4-anilionophenyl) acrylamide, N-(4-anilionophenyl)methacrylamide, N-(4-anilionophenyl)-cinnamamide, N-(4-anilionophenyl) crotonacrylamide, N-phenyl-4-(3-vinylbenzyloxy)aniline and N-phenyl-4-(4-vinylbenzyloxy)aniline. These copolymerizable monomers may be used as a combination of at least two thereof.

The lower limit of the Mooney viscosity ($ML_{1+4}$, 100° C.) of the nitrile group-containing highly saturated copolymer rubber used in the present invention is preferably 15, more preferably 30 and especially preferably 45, and the upper limit thereof is preferably 200 and more preferably 100. When the Mooney viscosity is too small, a foamed and shaped rubber article of the present invention has poor mechanical strength. In contrast, when the Mooney viscosity is too large, a foamable rubber composition of the present invention has poor processability.

The upper limit of the iodine value of the nitrile group-containing highly saturated copolymer rubber is preferably 120, more preferably 80 and especially preferably 50. When the iodine value is too large, balance between elongation and strengths of a foamed and shaped rubber article of the invention becomes bad.

Polyethylene

Polyethylene used in the present invention is a homopolymer of ethylene or a copolymer of ethylene with an α-olefin monomer. The ethylene/α-olefin copolymer is preferably a copolymer containing not more than 5% by mole of α-olefin monomer units. As specific examples of the polyethylene, there can be mentioned low-density polyethylene having long chain branches produced by a radical polymerization carried out under a high pressure, for example, about 1,000 atmospheric pressure; straight-chain high-density polyethylene produced by a coordination anion polymerization carried out in the presence of a transition metal catalyst under a low pressure for example, about 50 atmospheric pressure; and straight-chain low-density polyethylene produced by copolymerization with an α-olefin monomer carried out in the presence of a transition metal catalyst under a low pressure, for example, about 50 atmospheric pressure.

The density of polyethylene is not particularly limited, but, the lower limit thereof is preferably 0.91 $Mg/m^3$ ($g/cm^3$), more preferably 0.94 $Mg/m^3$, and the upper limit thereof is preferably 1.00 $Mg/m^3$. When specific gravity of polyethylene is too small, a foamed and shaped rubber article of the present invention has poor tear resistance and abrasion-resistance. In contrast, when specific gravity of polyethylene is too large, the polyethylene becomes difficult to produce.

The melt flow rate of polyethylene as measured at 190° C. and 21.18 N under testing condition 4 of JIS K7210 is not particularly limited, but, the lower limit of the melt flow rate is preferably 0.001 g/10 min., more preferably 0.1 g/10 min., and the upper limit thereof is preferably 30 g/10 min. When the melt flow rate is too small, a foamable rubber composition of the present invention tends to exhibit poor processability and a foamed and shaped rubber article is difficult to produce. In contrast, when the melt flow rate is too large, the polyethylene is difficult to produce and the foamed and shaped rubber article has poor physical properties.

The lower limit of the amount of polyethylene is, based on 100 parts by weight of the nitrile group-containing highly saturated copolymer rubber, preferably 5 parts by weight, and the upper limit thereof is preferably 150 parts by weight, more preferably 100 parts by weight and especially preferably 50 parts by weight. When the amount of polyethylene is too large, kneading of the rubber composition becomes difficult. In contrast, the amount thereof is too small, a foamed and shaped rubber article has poor mechanical strengths.

Metal Salt of Ethylenically Unsaturated Carboxylic Acid

An ethylenically unsaturated carboxylic acid for the preparation of a metal salt thereof used in the present invention has at least one free carboxyl group for forming the metal salt and includes, for example, unsaturated monocarboxylic acids, unsaturated dicarboxylic acids and monoesters of unsaturated dicarboxylic acids. As specific examples of the ethylenically unsaturated carboxylic acid, there can be mentioned unsaturated monocarboxylic acids such as acrylic acid and methacrylic acid, unsaturated dicarboxylic acids such as maleic acid, fumaric acid and itaconic acid; and monoesters of unsaturated dicarboxylic acids such as monomethyl maleate, monoethyl maleate, monomethyl itaconate and monoethyl itaconate.

Of these, ethylenically unsaturated carboxylic acids having no eater group are preferable in view of the mechanical strengths of a foamed and shaped rubber article. An unsaturated monocarboxylic acid and an unsaturated dicarboxylic acid are more preferable. An unsaturated monocarboxylic acid is especially preferable.

The metal for the preparation of the metal salt of an unsaturated carboxylic acid is not particularly limited provided that it is capable of forming a salt with the above-mentioned unsaturated carboxylic acid, but, in view of the mechanical strengths of a foamed and shaped rubber article, it is preferably selected from zinc, magnesium a calcium, barium, titanium, chromium, iron, cobalt, nickel, aluminum, tin and lead, more preferably from zinc, magnesium, calcium and aluminum, and especially preferably from zinc and magnesium.

The lower limit of the content of metal for the preparation of the metal salt of an ethylenically unsaturated carboxylic acid is, per mole of carboxyl group in the ethylenically unsaturated carboxylic acid, is preferably 0.2 mole, more preferably 0.3 mole and especially preferably 0.4 mole, and the upper limit thereof is preferably 3 moles, more preferably 2 moles and especially preferably 1 mole. When the relative amount of metal to an ethylenically unsaturated carboxylic acid is too small, a foamable rubber composition and a foamed and shaped rubber article give off an offensive smell of residual monomer. In contrast, when the relative amount of metal to an ethylenically unsaturated carboxylic acid is too large, a foamed and shaped rubber article has poor mechanical strengths.

The method of preparing the foamable rubber composition by mixing and kneading together the metal salt of an ethylenically unsaturated carboxylic acid with rubber and other ingredients includes, for example, is a method of mixing the metal salt of an ethylenically unsaturated carboxylic acid with rubber and other ingredient, (ii) a method of mixing an ethylenically unsaturated carboxylic acid with an oxide, hydroxide or carbonate of metal and allowing these ingredients to, react with each other during kneading to produce the metal salt of an ethylenically unsaturated, carboxylic acid, and (iii) a method of preparing a master batch of the metal salt of an ethylenically unsaturated carboxylic acid and mixing the master batch with rubber and other ingredients at a proportion such that a rubber composition of the present invention having the desired metal salt content is prepared.

The lower limit of the amount of the metal salt of an ethylenically unsaturated carboxylic acid its, based on 100 parts by weight of the nitrile group-containing highly saturated copolymer rubber, preferably 3 parts by weight, more preferably 5 parts by weight and especially preferably 10 parts by weight, and the upper limit thereof is preferably 100 parts by weight, more preferably 70 parts by weight and especially preferably 50 parts by weight. When the relative amount of the metal salt of an ethylenically unsaturated carboxylic acid to the nitrile group-containing highly saturated copolymer rubber is too small, a foamed and shaped rubber article has poor mechanical strengths. In contrast, when the relative amount of the metal salt of an ethylenically unsaturated carboxylic acid to the nitrile group-containing highly saturated copolymer rubber is too large, a foamed and shaped rubber article has poor elongation.

Organic Peroxide

The organic peroxide used in the prevent invention is not particularly limited, and those which are used in a rubber industry as organic peroxide crosslinking agents for crosslinking rubber and polyethylene may be used. The organic peroxide includes, for example, dialkyl peroxides, diacyl peroxides and peroxy eaters. As specific examples of these organic peroxides, there can be mentioned dialkyl peroxides such as dicumyl peroxide, di-t-butyl peroxide, 2,5-dimethyl-2,5-di(t-butylperoxy)-3-hexyne, 2,5-dimethyl-2,5-di(t-butylperoxy)-3-hexane and 1,3-bis(t-butylperoxyisopropyl)benzene; dialkyl peroxides such as benzoyl peroxide and isobutyryl peroxide; and peroxy esters such as 2,5-dimethyl-2,5-bis(benzoylperoxy)hexane and t-butylperoxyisopropyl carbonate. These organic peroxides may be used either alone or in the form of being dispersed in, for example, clay, calcium carbonate or silica. When an organic peroxide is used in the latter form, a foamable rubber composition exhibits enhanced processability. The, organic peroxides may be used as a combination of at least two thereof.

The lower limit of the amount of organic peroxide is, based on 100 parts by weight of the nitrile group-containing highly saturated copolymer rubber, preferably 0.5 part by weight, and the upper limit thereof is preferably 10 parts by weight, more preferably 8 parts by weight and especially preferably 6 parts by weight. When the relative amount of organic peroxide to the nitrile group-containing highly saturated copolymer rubber is too small, crosslinking reaction does not occur to the desired extent at the step of producing a foamed and shaped rubber article. In contrast, when the relative amount of organic peroxide to the nitrile group-containing highly saturated copolymer rubber is too large, a foamed and shaped rubber article is hard and has poor rubber elasticity.

Foaming Agent

The foaming agent used in the present invention is not particularly limited, and any foaming agent can be adopted provided that it is used in a rubber industry. The foaming agent includes, for example, azo compound foaming agents, sulfonylhydrazide compound foaming agents and amine compound foaming agents, of these, azo compound foaming agents are preferable because they do not give no baneful influence upon the crosslinking caused by an organic peroxide. As specific examples of the foaming agents, there can be mentioned azo compound foaming agents such as azodicarbonamide and azobisisobutyronitrile; sulfonylhydrazide compound foaming agents such as benzenesulfonylhydrazide, p-toluenesulfonylhydrazide and 4,4-oxybis-(benzenesulfonylhydrazide) and amine compound foaming agents such as N,N-dinitrosopentamethylenetetramine.

The foaming agent may be used either alone or as a combination of at least two thereof. An ingredient for lowering the decomposition temperature of the foaming agent may be incorporated which includes, for example, zinc oxide, urea and ethanolamine.

The lower limit of the amount of a foaming agent is, based on 100 parts by weight of the nitrile group-containing highly saturated copolymer rubber, preferably 1 part by weight, and the upper limit thereof is preferably 30 parts by weight, more preferably 20 parts by weight and especially preferably 15 parts by weight. When the amount of a foaming agent is too small, foaming does not occur to the desired extent and a resulting foamed and shaped rubber article is not characterized as foamed rubber. In contrast, when the amount of a foaming agent is too large, the extent of foaming becomes excessively large and the size of cells becomes non-uniform and too large, and the resulting foamed and shaped rubber article has extremely reduced mechanical strengths and abrasion resistance.

Other Ingredients

According to the need, the foamable rubber composition of the present invention may have further incorporated therein ingredients other than the above-mentioned ingredients, which are used in a rubber industry and include, for example, a reinforcer such as carbon black, silica or talc, a filler such as calcium carbonate or clay, a processing aid, a plasticizer, an antioxidant, an antiozonant, a co-crosslinking agent and a colorant. The amount of these optional ingredients may be appropriately chosen so that the intended function can be achieved while the object of the present invention is not impeded.

Especially, a metal salt of a higher fatty acid is preferably incorporated in the foamable rubber composition of the present invention. By the incorporation of a higher fatty acid metal salt, the foamable rubber composition exhibits a reduced viscosity and enhanced processability.

A higher fatty acid having a carboxyl functional group, which forms the higher fatty acid metal salt, has carbon atoms except for the carboxyl functional group, the lower limit of which is preferably 6, more preferably 8 and especially preferably 10 and the upper limit of which is preferably 30, more preferably 25 and especially preferably 20. When the number of carbon atoms except for the carboxyl functional group of higher fatty acid is too small, the higher fatty acid is liable to volatilize and give off an offensive small when exposed to a high temperature during kneading or foaming and shaping, and, when the content of the higher fatty acid metal salt is excessively lowered, the releasability of the foamed and shaped rubber article from a mold tends to become poor. In contrast, when the number of carbon atoms except for the carboxyl functional group of higher fatty acid is too large, the higher fatty acid metal salt has a high melting point and workability at the step of kneading is liable to become poor.

The higher fatty acid includes saturated higher fatty acids and unsaturated higher fatty acids. As specific examples of the saturated higher fatty acids, there can be mentioned caproic acid, caprylic acid, capric acid, lauric acid, tridecylic acid, myristic acid, pentadecylic acid, stearic acid, nonadecanoic acid, arachic acid, behenic acid, lignoceric acid, cerotic acid, montanic acid and melissic acid. As specific examples of the unsaturated highest fatty acids, there can be mentioned oleic acid, elaidic acid, linolic acid, linolenic acid and arachidonic acid.

The metal of the higher fatty acid metal salt is not particularly limited, but is preferably selected from metals of group 1, group 2, group 12 and group 14 of the periodic table. As specific examples of the metal, there can be mentioned metals of group 1 such as lithium, potassium and sodium; metals of group 2 such as magnesium, calcium and barium; metals of group 12 such as zinc and cadmium; and metals of group 14 such as tin and lead. More preferably the metal is selected from lithium, potassium, sodium, magnesium, calcium, zinc and tin. Magnesium, calcium, zinc and tin are especially preferable.

The lower limit of the amount of the higher fatty acid metal salt is, based on 100 parts by weight of the nitrile group-containing highly saturated copolymer rubber, preferably 0.1 part by weight, more preferably 0.5 part by weight and especially preferably 0.7 part by weight, and the upper limit thereof is preferably 20 parts by weight, more preferably 15 parts by weight and especially preferably 10 parts by weight. When the amount of the higher fatty acid metal salt is too small, a foamed and shaped rubber article has poor releasability from a mold. In contrast, when the amount of the higher fatty acid metal salt is too large, a foamed and shaped rubber article exhibits an undesirably reduced crosslink density.

Foamable Rubber Composition

The foamable rubber composition of the present invention comprises a nitrile group-containing highly saturated copolymer rubber, polyethylene, a metal salt of an ethylenically unsaturated carboxylic acid, an organic peroxide and a foaming agent. According to the need, the foamable composition may further comprise various ingredients as optional ingredients other than these ingredients.

Method of Preparing Foamable Rubber Composition

The foamable rubber composition of the present invention is prepared by kneading together a nitrile group-containing highly saturated copolymer rubber, polyethylene, a metal salt of an ethylenically unsaturated carboxylic acid, an organic peroxide, a foaming agent and optional ingredients by using an ordinary kneader such as a roll mill or a closed type kneader.

The order in which the respective ingredients are mixed together at the step of kneading is not particularly limited unless crosslinking or foaming occurs during kneading. For example, the respective ingredients are mixed together in the following order. First, a nitrile group-containing highly saturated copolymer rubber is kneaded with a metal salt of an ethylenically unsaturated carboxylic acid by a roll mill at a temperature (kneaded mixture temperature) of 140° C. to prepare a master batch. Then the master batch is kneaded with polyethylene at a temperature (kneaded mixture temperature) of 140° C. during which optional ingredients incapable of being decomposed or 140° C. are incorporated in the kneaded mixture, until solid polyethylene disappears. The resulting mixture is cooled to room temperature, and then an organic peroxide, a foaming agent and optional ingredients capable of being decomposed at 140° C. are incorporated therein and kneaded together. This final kneading is carried out at a temperature such that the organic peroxide is not decomposed and the foaming agent does not foam and kneading can be easily carried out. Preferably the final kneading temperature (kneaded mixture temperature) is not higher than 100° C.

Foamed and Shaped Rubber Article

The foamed and shaped rubber article of the present invention is made by foaming and shaping the above-mentioned foamable rubber composition. The lower limit of the extent of foaming is preferably 100%, more preferably 150% and especially preferably 200%, and the upper limit thereof is preferably 2,000%, more preferably 1,500% and especially preferably 1,000%. When the extent of foaming is too small, the benefits due to foaming are minimized, and the foamed and shaped rubber article is not characterized as a foamed rubber, i.e., it does not have a low specific gravity, good impact resistance and high heat insulation. In contrast, when the extent of foaming is too large, the foamed and shaped rubber article has non-uniform and undesirably large cells, and thus, exhibits very poor mechanical strengths and extremely reduced abrasion resistance.

By the term "extent of foaming" used herein, we mean a ratio of volume expansion occurring due to foaming, which is expressed by a ratio in percent of the specific gravity of an non-foamed foamable rubber composition to the specific gravity of a foamed and shaped rubber article. When the extent of foaming is large, the ratio of volume expansion occurring due to foaming at the step of foaming and shaping is large.

The lower limit of the hardness as expressed by type E durometer hardness is preferably 10, more preferably 20 and especially preferably 30, and the upper limit thereof is preferably 95, more preferably 90 and especially preferably 85.

The foamed and shaped rubber article of the present invention can be made by foaming and shaping the foamable rubber composition. Foaming and shaping are concurrently carried out for making the foamed and shaped rubber article. Shaping is carried out by an ordinary method employed in a rubber industry, which includes, for example, compression molding, transfer molding, injection molding and extruding. When the shaping is conducted under heated conditions, foaming and crosslinking simultaneously occur.

The foamed and shaped rubber article can be made at one step by foaming and shaping the foamable rubber composition. The temperature at which the foaming and shaping are carried out is preferably in the range of 140 to 180° C. The time for which the foaming and shaping are carried out is appropriately chosen depending upon the particular shape, especially thickness, of the foamed dad shaped rubber article, and is preferably in the range of 2 to 30 minutes. By this operation, foaming of the foamable rubber composition is fundamentally completed.

After completion of the foaming and shaping, second crosslinking (secondary crosslinking) can be conducted to remove strain of a foamed and shaped rubber article or improve the properties of the foamed and shaped rubber article. The conditions employed for the second crosslinking are not particularly limited, but usually the second crosslinking is carried out at a crosslinking temperature of 50 to 180° C. for a crosslinking time of 1 to 5 hours, in the second crosslinking, foaming does not substantially occur.

EXAMPLES

The invention will now be specifically described by the following examples and comparative examples.

Examples 1 to 11, Comparative Example 1

Using nitrile group-containing highly saturated copolymer rubbers shown in Table 1 and polyethylene shown in Table 2, foamable rubber compositions were prepared by an open roll for kneading according to the recipes shown in Tables 3 and 4. More particularly, a nitrile group-containing highly saturated copolymer rubber, polyethylene and a metal salt of an ethylenically unsaturated carboxylic acid were kneaded together so that the temperature of the kneaded mixture reached 150° C. The kneading was carried out until disappearance of solid polyethylene was confirmed, and, kneading was further continued for 5 minutes. Thereafter the kneaded mixture was left to stand until it reached room temperature. While the open roll was maintained at a temperature of 40° C., ingredients other than an organic peroxide and a foaming agent were incorporated and kneaded together with the kneaded mixture, and finally the organic peroxide and the foaming agent were incorporated and kneaded together to prepare a foamable rubber composition.

The foamable rubber composition was placed in a mold having a size of 120 mm×120 mm×5 mm (thickness) where the composition was heated to 160° C. and maintained at that temperature for 10 minutes to be thereby foamed and molded into a foamed and shaped rubber article.

TABLE 1

| Rubber*1 | HNBR 1 | HNBR 2 | HNBR 3 |
|---|---|---|---|
| Bound acrylonitrile content (wt. %) | 36 | 36 | 15 |
| Bound butadiene content (wt. %) | 64 | 64 | 35 |
| Bound n-butyl itaconate content (wt. %) | — | — | 50 |
| Iodine value of polymer | 28 | 4 | 24 |
| Mooney viscosity of polymer | 78 | 85 | 80 |

*1 Rubber: Nitrile group-containing highly saturated copolymer rubber

TABLE 2

| Polyethylene | A | B | C | D | E | F | G |
|---|---|---|---|---|---|---|---|
| Specific gravity (Mg/m$^3$) | 0.953 | 0.958 | 0.961 | 0.955 | 0.922 | 0.920 | 0.921 |
| Melt flow rate (g/10 min) | 0.03 | 0.80 | 7.5 | 20 | 0.85 | 0.28 | 0.80 |

TABLE 3

|  | Example No. | | | | | |
|---|---|---|---|---|---|---|
|  | 1 | 2 | 3 | 4 | 5 | 6 |
| Recipe (weight part B) | | | | | | |
| Rubber*1 | HNBR 1 | HNBR 1 | HNBR 1 | HNBR 1 | HNBR 1 | HNBR 1 |
|  | 100 | 100 | 100 | 100 | 100 | 100 |
| Polyethylene | A | B | B | C | D | E |
|  | 29 | 29 | 40 | 29 | 29 | 29 |
| Zinc methacrylate | 16 | 16 | 16 | 16 | 16 | 16 |
| Magnesium stearte | 1.2 | 1.2 | 1.2 | 1.2 | 1.2 | 1.2 |
| Organic peroxide *2 | 8.7 | 8.7 | 8.7 | 8.7 | 8.7 | 8.7 |
| Foaming agent *3 | 11.6 | 11.6 | 11.6 | 11.6 | 11.6 | 11.6 |
| Plasticizer *4 | 5.8 | 58 | 5.8 | 5.B | 5.8 | 5.8 |
| Antioxitant *5 | 1.2 | 1.2 | 1.2 | 1.2 | 1.2 | 1.2 |
| Titanium oxide *6 | 2.9 | 2.9 | 2.9 | 2.9 | 2.9 | 2.9 |
| Mooney viscosity of composition | 56 | 55 | 66 | 55 | 54 | 38 |
| Cure test | | | | | | |
| Maximum torque (dN.m) | 5.8 | 4.4 | 5.1 | 4.6 | 4.4 | 4.5 |
| tc (10) (min) | 0.7 | 0.7 | 0.8 | 1.0 | 1.1 | 0.6 |
| tc (90) (min) | 14.0 | 13.6 | 14.2 | 14.1 | 14.3 | 12.9 |

*1 Nitrile group-containing highly saturated copolymer rubber
*2 Dicumyl peroxide content 40% by weight (Percumyl D-40, available from Nippon Oil and Fat Co.)
*3 Composite foaming agent predominantly comprised of azodicoarbonamide (Cellmike CAP 500, available from Sankyo Kasei K.K.)
*4 Tri-(2-ethylhexyl) trimellitate ("ADK oizer C-8" available from ADK Auguss Co.)
*5 Substituted diphenylamine ("Naugard 445" available from Uniroyal Co.)
*6 Titanim oxide R-680 available from Ishihara Sangyo K.K.

TABLE 4

| | | Example No. | | | | | |
|---|---|---|---|---|---|---|---|
| | | 7 | 8 | 9 | 10 | 11 | C.E. 1*7 |
| Recipe (weight parts) | | | | | | | |
| Rubber*1 | | HNBR 1 | HNBR 1 | MHBR 1 | HNBR 2 | HNBR 3 | HNBR 1 |
| | | 100 | 100 | 100 | 100 | 100 | 100 |
| Polyethylene | | F | G | G | B | B | — |
| | | 29 | 29 | 40 | 29 | 29 | |
| Zinc methacrylate | | 16 | 16 | 16 | 16 | 16 | 16 |
| Magnesium stearate | | 1.2 | 1.2 | 1.2 | 1.2 | 1.2 | 1.2 |
| Organic peroxide *2 | | 8.7 | 8.7 | 8.7 | 8.7 | 8.7 | 8.7 |
| Foaming agent *3 | | 11.6 | 11.6 | 11.6 | 11.6 | 11.6 | 11.6 |
| Plasticizer *4 | | 5.8 | 5.8 | 5.8 | 5.6 | 5.8 | 5.8 |
| Antioxidant *5 | | 1.2 | 1.2 | 1.2 | 1.2 | 1.2 | 1.2 |
| Titanium oxide *6 | | 2.9 | 2.9 | 2.9 | 2.9 | 2.9 | 2.9 |
| Mooney viscosity of composition | | 39 | 38 | 39 | 67 | 74 | 35 |
| Cure test | | | | | | | |
| Maximum torque | (dN.m) | 3.8 | 3.4 | 3.2 | 3.9 | 3.9 | 3.0 |
| tc (10) | (min) | 0.6 | 0.6 | 0.6 | 1.0 | 1.0 | 0.9 |
| tc (90) | (min) | 13.8 | 13.6 | 13.9 | 12.7 | 10.8 | 12.9 |

*1 through *6 are the same as described in the footnote of Table 3.
*7 Comparative Example 1

Mooney viscosity of each rubber composition, rate of crosslinking at the step of foaming and molding, and maximum torque at crosslinking were measured and are shown in Tables 3 and 4. Tensile strength, elongation, tensile stress at 100% elongation, tensile stress at 200%, elongation, specific gravity, extent of foaming, tear strength hardness, Akron abrasion wear, sponge shrinkage and shrink resistance of each foamed and shaped rubber article were measured and are shown in Tables 5 and 6.

Each foamed and shaped rubber article was heat-treated at 70% for 5 hours by Gear oven, and then left to stand fox 24 tours. Thereafter tensile strength, elongation, tensile stress at 100% elongation, tensile stress at 200% elongation, specific gravity, tear strength, hardness and Akron abrasion wear of the foamed and shaped rubber article were measured and are shown in Tables 7 and 8.

TABLE 5

| Example No. | 1 | 2 | 3 | 4 | 5 | 6 |
|---|---|---|---|---|---|---|
| Tensile test | | | | | | |
| Tensile strength (MPa) | 3.5 | 3.9 | 3.6 | 4.0 | 3.4 | 3.2 |
| Elongation at break (%) | 220 | 260 | 250 | 270 | 280 | 300 |
| 100% Tensile stress (MPa) | 2.5 | 2.1 | 1.9 | 1.9 | 1.4 | 2.2 |
| 200% Tensile stress (MPa) | 3.3 | 3.6 | 3.0 | 3.2 | 2.5 | 3.1 |
| Specific gravity of foamed and shaped rubber article | 0.30 | 0.24 | 0.21 | 0.20 | 0.18 | 0.28 |
| Extent of foaming (%) | 320 | 410 | 460 | 480 | 550 | 350 |
| Tear strength (kN/m) | 15.0 | 13.8 | 13.5 | 14.2 | 10.8 | 13.7 |
| Hardness | | | | | | |
| With skin layer | 55 | 59 | 62 | 60 | 59 | 57 |
| Without skin layer | 52 | 55 | 60 | 58 | 56 | 55 |

TABLE 5-continued

| Example No. | 1 | 2 | 3 | 4 | 5 | 6 |
|---|---|---|---|---|---|---|
| Akron abrasion wear (cc) | 0.55 | 0.18 | 0.16 | 0.19 | 0.23 | 0.26 |
| Sponge shrinkage after crosslinking (after 24 hrs, %) | 3.2 | 1.8 | 1.7 | 2.0 | 2.3 | 2.6 |
| Heat-treating test (70° C.) | | | | | | |
| Shrinkage after 1 hr (%) | 5.0 | 3.3 | 2.5 | 2.5 | 2.5 | 6.7 |
| Shrinkage after 3 hrs (%) | 7.5 | 5.8 | 3.3 | 5.0 | 5.4 | 10.8 |

TABLE 6

| Example No. | 7 | 8 | 9 | 10 | 11 | C.E. 1 |
|---|---|---|---|---|---|---|
| Tensile test | | | | | | |
| Tensile strength (MPa) | 3.2 | 3.0 | 2.6 | 3.0 | 4.0 | 3.6 |
| Elongation at break (%) | 250 | 270 | 260 | 230 | 240 | 200 |
| 100% Tensile stress (MPa) | 1.4 | 1.3 | 1.4 | 1.7 | 2.0 | 1.7 |
| 200% Tensile stress (MPa) | 2.7 | 2.4 | 2.1 | 2.9 | 3.7 | |
| Specific gravity of foamed and shaped rubber article | 0.21 | 0.21 | 0.20 | 0.15 | 0.23 | 0.23 |
| Extent of foaming (%) | 450 | 450 | 480 | 660 | 430 | 450 |
| Tear strength (kN/m) | 11.3 | 10.5 | 10.1 | 10.5 | 12.4 | 9.5 |
| Hardness | | | | | | |
| With skin layer | 55 | 52 | 56 | 47 | 57 | 45 |

TABLE 6-continued

| Example No. | 7 | 8 | 9 | 10 | 11 | C.E. 1 |
|---|---|---|---|---|---|---|
| Without skin layer | 51 | 49 | 52 | 43 | 54 | 38 |
| Akron abrasion wear (cc) | 0.41 | 0.40 | 0.47 | 0.27 | 0.30 | 0.23 |
| Sponge shrinkage after crosslinking (after 24 hrs, %) | 3.3 | 3.1 | 3.0 | 2.7 | 2.1 | 6.6 |
| Heat-treating test (70° C.) | | | | | | |
| Shrinkage after 1 hr (%) | 6.7 | 6.7 | 5.0 | 3.3 | 4.2 | 9.2 |
| Shrinkage after 3 hrs (%) | 10.8 | 10.8 | 6.7 | 6.3 | 7.5 | 16.7 |

TABLE 7

| Example No. | 1 | 2 | 3 | 4 | 5 | 6 |
|---|---|---|---|---|---|---|
| Tensile test | | | | | | |
| Tensile strength (MPa) | 3.0 | 4.2 | 4.2 | 3.7 | 3.1 | 4.3 |
| Elongation at break (%) | 220 | 260 | 260 | 270 | 280 | 280 |
| 100% Tensile stress (MPa) | 2.3 | 2.1 | 2.2 | 1.7 | 1.3 | 1.7 |
| 200% Tensile stress (MPa) | 2.9 | 3.7 | 3.5 | 2.9 | 2.3 | 3.3 |
| Specific gravity of foamed and shaped rubber article | 0.30 | 0.23 | 0.22 | 0.20 | 0.18 | 0.27 |
| Tear strength (kN/m) | 15.5 | 14.0 | 14.4 | 14.0 | 10.7 | 14.0 |
| Hardness | | | | | | |
| With skin layer | 58 | 60 | 63 | 60 | 58 | 58 |
| Without skin layer | 57 | 58 | 61 | 57 | 56 | 57 |
| Akron abrasion wear (cc) | 0.58 | 0.18 | 0.16 | 0.17 | 0.25 | 0.25 |

TABLE 8

| Example No. | 7 | 8 | 9 | 10 | 11 | C.E. 1 |
|---|---|---|---|---|---|---|
| Tensile test | | | | | | |
| Tensile strength (MPa) | 3.4 | 3.0 | 3.0 | 2.9 | 4.0 | 4.2 |
| Elongation at break (%) | 260 | 260 | 280 | 230 | 250 | 220 |
| 100% Tensile stress (MPa) | 1.5 | 1.3 | 1.3 | 1.5 | 1.9 | 1.7 |
| 200% Tensile stress (MPa) | 2.9 | 2.5 | 2.3 | 2.7 | 3.5 | 4.0 |
| Specific gravity of foamed and shaped rubber article | 0.22 | 0.22 | 0.21 | 0.15 | 0.23 | 0.29 |
| Tear strength (kN/m) | 11.5 | 10.6 | 10.7 | 10.6 | 12.6 | 10.5 |
| Hardness | | | | | | |
| With skin layer | 57 | 55 | 58 | 48 | 59 | 47 |
| Without skin layer | 55 | 54 | 56 | 44 | 55 | 42 |
| Akron abrasion wear (cc) | 0.34 | 0.40 | 0.47 | 0.23 | 0.25 | 0.24 |

The measurement of the above-specified properties was carried out by the following methods.

(1) Mooney Viscosity

Mooney viscosity of a foamable rubber composition was expressed by $ML_{1+4}$ as measured at 100° C. by Mooney viscosity test in physical testing methods of unvulcanized rubber stipulated in JIS K6300.

(2) Tensile Strength, Elongation, 100% Tensile Stress and 200% Tensile Stress

Tensile strength, elongation, 100% tensile stress and 200% tensile stress of a foamed and shaped rubber article were determined as follows. A skin layer of a crosslinked, foamed and shaped rubber article was removed by using a splitting machine available from Deutsche Fortuner Co. to prepare a sheet having a thickness of 2 mm. A JIS #3 dumbbell specimen was punched from the sheet, and the measurement was carried out at a drawing rate of 500 mm/min according to JIS K6251.

(3) Maximum Torque ($M_H$), tc (10) and tc (90)

Maximum torque ($M_H$), tc (10) and tc (90) were measured by a die vulcanization test method A according to vulcanization test using an oscillating vulcanization tester in physical testing methods of unvulcanized rubber stipulated in JIS K6300.

(4) Tear Strength

Tear strength was determined is follows. A skin layer of a crosslinked, foamed and shaped rubber article was removed by using a splitting machine available from Deutsche Fortuner Co. to prepare a sheet having a thickness of 2 mm. A non-notched angle test specimen was prepared and the measurement was carried out at a drawing rate of 500 mm/min according to JIS K6252.

(5) Specific Gravity

Specific gravity of a foamed and shaped rubber article was measured by method A for determining density of vulcanized rubber according to JIS K6268.

(6) Hardness

Hardness of a foamed and shaped rubber article was measured by a hardness tester for low hardness (type E. durometer) according to JIS K6253. The hardness was measured on a specimen having a skin layer and a specimen from which a skin layer was removed.

(7) Akron Abrasion Wear

A skin layer of a crosslinked, foamed and shaped rubber article was removed to prepare a sheet having a thickness of 3 mm. The sheet was adhered onto an Akron abrasion test specimen with JIS-A hardness of 70 by using an adhesive to prepare a test specimen. Abrasion loss in volume was measured by using an Akron abrasion test machine at a load of 27N, an inclination angle of 15 degree, a preliminary abrasion of 500 times and a test abrasion of 1,000 times according to JIS K6254. The smaller the abrasion loss volume, the better the abrasion resistance.

(8) Sponge Shrinkage

Sponge shrinkage means extent of shrinkage as observed when a foamed and shaped rubber article was left to stand for 24 hours. Two side lengths of a square specimen were measured after the specimen was left to stand for 24 hours, and the sponge shrinkage was expressed by an average shrinkage in % of two side lengths relative to the original side lengths as measured immediately after crosslinking. A small sponge shrinkage means that shrinkage of a final rubber product is small and thus product design can be made easily.

(9) Shrinkage upon Heating

A skin layer of a crosslinked, foamed and shaped rubber article was removed to prepare a rectangular parallelopiped specimen having a size of 120 mm×15 mm×3 mm. The specimen was maintained at 70° C. for a predetermined time in a Geer oven, and length of the side with an original length of 120 mm was measured. The shrinkage was expressed by shrinkage in % of the side length relative to the original side length of 120 mm. The smaller the shrinkage value, the better the shrink resistance of the foamed and shaped rubber article.

As seen from the results shown in Tables 5, 6 and 7, the foamed and shaped rubber articles in Examples 1 to 11, which contain polyethylene, exhibit enhanced elongation, high tear strength, reduced sponge shrinkage, improved shrink resistance and enhanced hardness, as compared with the article of Comparative Example 1.

As seen from comparison of Example 2 with Example 3 and comparison of Example 8 with Example 9, the hardness of a foamed and shaped rubber article can be enhanced by increasing the amount of polyethylene, while other physical properties are kept.

Comparison of Examples 2 to 6 with Comparative Example 1 reveals that the foamed and shaped rubber articles of the present invention exhibit abrasion resistance of acceptable level. Especially when a linear polyethylene, preferably a straight chain polyethylene having a malt flow rate (190° C., 21.18N) of 0.1 to 20 g/10 min, is incorporated, a foamed and shaped rubber article having a remarkably enhanced abrasion resistance can be obtained.

Even when a nitrile group-containing highly saturated copolymer rubber with an extremely low iodine value is used (Example 10) or the copolymer rubber having copolymerized therein an ethylenically unsaturated monomer is used (Example 11), the above-mentioned benefits brought about by incorporation of polyethylene are obtained.

Physical properties of heat-treated, foamed and shaped rubber articles are shown in Tables 7 and 8. In Comparative Example 1, when a foamed and shaped rubber article is heat-treated, mechanical strengths of the rubber article are enhanced to some extent. But, the specific gravity is varied to a considerable extent. In contrast, in Examples of the present invention, when foamed and shaped rubber articles are heat-treated, physical properties thereof do not vary or vary only to a slight extent. This means that the rubber articles of the present invention exhibit improved heat resistance.

To sum up the results in the working examples, the following will be apparent.

In the prior art represented by Comparative Example 1, the foamed and shaped rubber article exhibits shrink after crosslinking and when heat-treated. That is, the specific gravity and dimensions are greatly changed, and thus, it is very difficult to stably produce uniform foamed rubber products.

In contrast, in the foamed and shaped rubber article made from the foamable rubber composition of the present invention, specific gravity and physical properties including mechanical strengths, hardness and abrasion resistance are not varied or are varied only to a slight extent. Thus, the quality of the foamed rubber product is stable.

INDUSTRIAL APPLICABILITY

By the present invention, a foamable rubber composition exhibiting improved processability is provided. A foamed and shaped rubber article made from the foamable rubber composition has improved elongation, tear strength, hardness and abrasion resistance, and, even when the rubber article is heat-treated, the elongation, tear strength, hardness and abrasion resistance are not varied or are varied only to a slight extent. Therefore, the quality of the foamed rubber article is stable and the production control thereof is easy.

In view of these beneficial characteristics, the foamable rubber composition of the present invention is suitable for shoe sole material for sports shoes and work shoes, industrial roll material, sealing material, industrial heat insulating material, cushioning material.

What is claimed is:

1. A foamable rubber composition comprising a nitrile group-containing highly saturated copolymer rubber, polyethylene, a metal salt of an ethylenically unsaturated carboxylic acid, an organic peroxide and a foaming agent.

2. The foamable rubber composition according to claim 1, which comprises a nitrile group-containing highly saturated copolymer rubber, polyethylene a metal salt of an ethylenically unsaturated carboxylic acid, a metal salt of a higher fatty acid, an organic peroxide and a foaming agent.

3. The foamable rubber composition according to claim 1, which comprises 100 parts by weight of a nitrile group-containing highly saturated copolymer rubber, 5 to 100 parts by weight of polyethylene, 3 to 100 parts by weight of a metal salt of an ethylenically unsaturated carboxylic acid, 0.5 to 10 parts by weight of an organic peroxide and 1 to 15 parts by weight of a foaming agent.

4. The foamable rubber composition according to claim 2, which comprises 100 parts by weight of a nitrile group-containing highly saturated copolymer rubber, 5 to 100 parts by weight of polyethylene, 3 to 100 parts by weight of a metal salt of an ethylenically unsaturated carboxylic acid, 0.1 to 20 parts by weight of a metal salt of a higher fatty acid, 0.5 to 10 parts by weight of an organic peroxide and 1 to 15 parts by weight of a foaming agent.

5. The foamable rubber composition according to claim 1, wherein the nitrile group-containing highly saturated copolymer rubber has an iodine value of not larger than 120.

6. The foamable rubber composition according to claim 1, wherein the nitrile group-containing highly saturated copolymer rubber contains 10 to 60% by weight of units of an α, β-ethylenically unsaturated nitrile monomer.

7. The foamable rubber composition according to claim 1, wherein the nitrile group-containing highly saturated copolymer rubber has a Mooney viscosity ($ML_{1+4}$, 100° C.) of 15 to 200.

8. The foamable rubber composition according to claim 1, wherein the polyethylene is et homopolymer of ethylene or a copolymer of ethylene with preferably not larger than 5% by mole of an α-olefin monomer.

9. The foamable rubber composition according to claim 8, wherein the polyethylene has a specific gravity in the range of 0.91 to 1.00 $Mg/m^3$.

10. The foamable rubber composition according to claim 8, wherein the polyethylene has a melt flow rate, as measured at 190° C. and 21.18N, of 0.001 to 30 g/10 min.

11. The foamable rubber composition according to claim 1, wherein the metal salt of an ethylenically unsaturated carboxylic acid is a zinc or magnesium salt of acrylic acid or methacrylic acid.

12. The foamable rubber composition according to claim 1, wherein the metal salt of a higher fatty acid has a structure such that a metal is bonded through ionic bond to a higher fatty acid having a carboxyl functional group, which has 6 to 30 carbon atoms except for the carboxyl functional group.

13. The foamable rubber composition according to claim 1, wherein the foaming agent is an azo compound foaming agent.

14. A foamed and shaped rubber article made by foaming and shaping a foamable rubber composition as claimed in claim 1.

15. The foamed and shaped rubber article according to claim 14, wherein the extent of foaming is in the range of 100% to 2,000%.

16. The foamed and shaped rubber article according to claim 14, wherein the hardness as expressed by a type E durometer hardness is in the range of 10 to 95.

17. The foamed and shaped rubber article according to claim 14, which is a shaped article for shoe sole.

* * * * *